United States Patent [19]
Bourne et al.

[11] 3,849,299
[45] Nov. 19, 1974

[54] INHIBITING THE COKE FORMING TENDENCY OF SORBENTS

[75] Inventors: Kenneth Hugh Bourne, Sunbury-on-Thames; Evan Ellis Davies, London; Robert Chalmers Pitkethly, Camberley, all of England

[73] Assignee: The British Petroleum Company Limited, London, England

[22] Filed: Dec. 6, 1972

[21] Appl. No.: 312,531

Related U.S. Application Data

[63] Continuation of Ser. No. 77,893, Oct. 5, 1970, abandoned.

[52] U.S. Cl............ 208/310, 252/416, 260/676 MS
[51] Int. Cl................................................ C07c 7/12
[58] Field of Search............ 252/411, 416; 208/310; 260/676 MS

[56] References Cited
UNITED STATES PATENTS
3,039,953   6/1962   Eng.................................... 252/416
3,258,417   6/1966   Hess et al..................... 260/676 MS

*Primary Examiner*—Herbert Levine
*Attorney, Agent, or Firm*—Morgan, Finnegan, Durham & Pine

[57] ABSTRACT

In catalysis or sorption processes using a zeolite as a single refractory oxide of a Gp II, III or IV element, the catalyst or sorbent is treated with an atmosphere of hydrogen at at least 300°C, preferably at least 350°C after exposure to an oxygen-containing gas and before use or re-use. It has been found that oxygen is strongly held on the catalyst or sorbent and contributes to the formation of coke unless removed. A severe treatment is necessary to remove it.

The process is particularly suitable for 5A zeolite sorbents used in n-paraffin separation, the decline in capacity of the zeolite with time being halved in one experiment.

8 Claims, 1 Drawing Figure

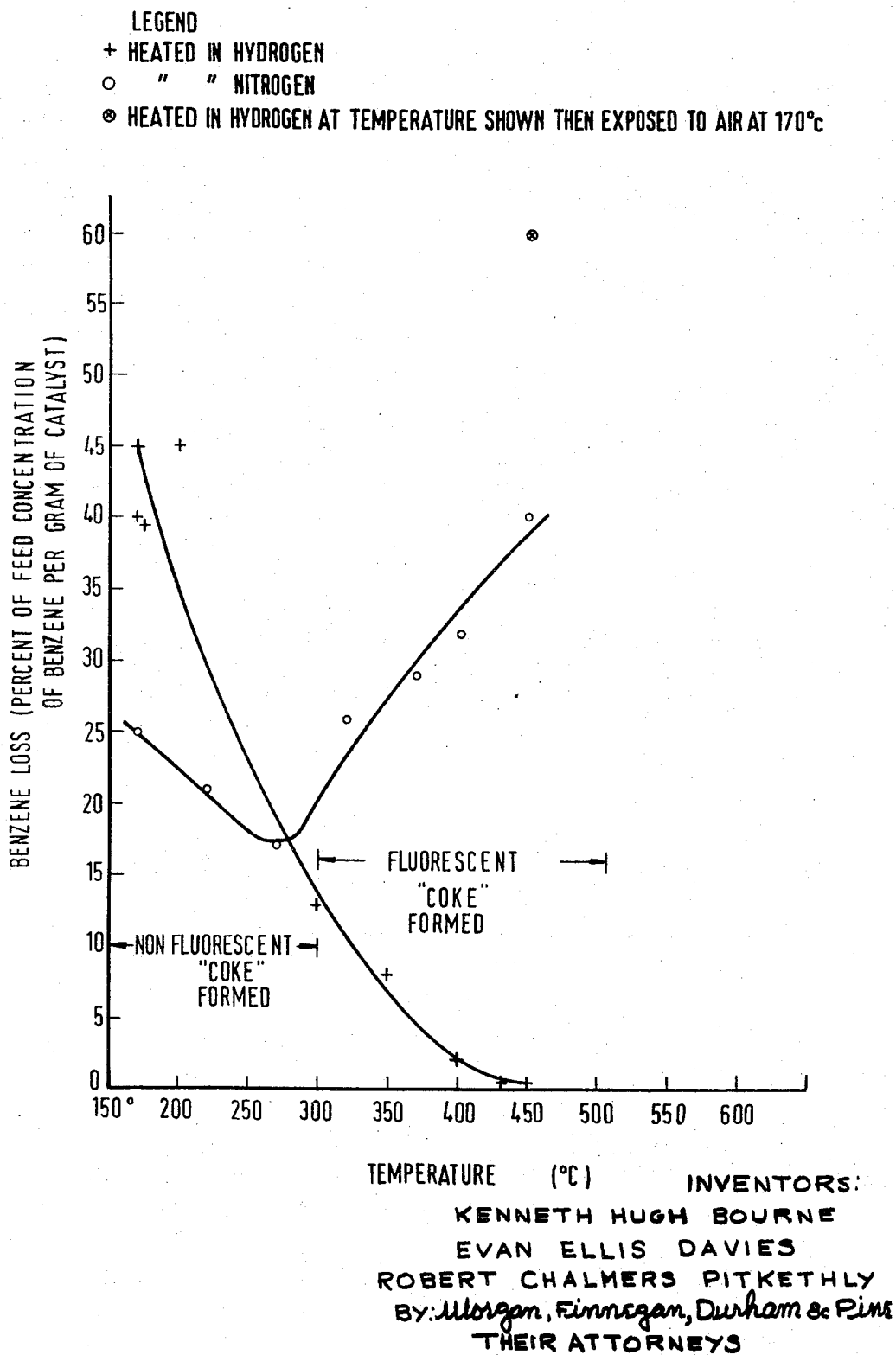

INHIBITING THE COKE FORMING TENDENCY OF SORBENTS

This is a continuation of application Ser. No. 77,893 filed Oct. 5, 1970 and now abandoned.

This invention is concerned with reducing the coke-forming tendency of certain solid inorganic catalysts and sorbents.

Solid inorganic catalysts and sorbents are well known in the petroleum and petro-chemical industries.

Zeolites are one important group of such materials, being used commercially as sorbents for the separation of hydrocarbons, particularly the separation of n-paraffins from hydrocarbon mixtures, and also for the removal of water and $H_2S$ from gases. They are also used as catalysts or catalyst supports in a variety of reactions, particularly those reactions operating by the so-called carbonium-ion mechanism. Other materials are refractory oxides of elements of Group II, III and IV of the Periodic Table, particularly alumina, which are used both as catalysts and catalyst supports and as sorbents. When used as catalysts or catalyst supports they may contain from 0.1 to 10 percent wt of halogen, particularly fluorine or chlorine.

Depending on the exact form of the material and its intended use these catalysts and sorbents have a certain acidity, due, it is believed, to the presence of active sites on their surface, which are sometimes referred to as acid sites. This acidity is believed to be a major factor in the usually undesirable tendency of catalysts and sorbents to form carbonaceous deposits commonly referred to as "coke". For example, in processes operating in the presence of an additional dehydrogenating-/hydrogenating function and hydrogen, e.g. catalytic reforming, the theoretically most desirable process conditions cannot always be used because of the need to impose other conditions which keep coke formation within tolerable limits. In sorption processes, e.g., n-paraffin separation processes, decline in adsorptive capacity due to coke formation is a principal limiting factor on the efficiency of the processes.

A study of the factors causing coke formation in catalysts and sorbents is thus of considerable potential practical significance. In some cases, as indicated above, operators have come to terms with this characteristic of catalysts and developed techniques to minimise its disadvantages. However there is still scope for improvement, particularly in processes operating in the absence of hydrogen and especially in sorption processes where the acidic nature of the sorbent has no beneficial effect and is just an unfortunate consequence of the chemical nature of the sorbent.

It has now been found that oxygen is strongly held on the acidic sites of catalysts and sorbents, that its presence contributes very largely to potential coke-forming polymerisation reactions, and that it can only be removed by a relatively severe treatment.

According to the present invention therefore a process of catalysis or sorption in which the catalyst or sorbent comprises a zeolite or a single refractory oxide of an element of Group II, III or IV of the Periodic Table is characterised in that the catalyst or sorbent is treated after exposure to an oxygen-containing gas and before its use or re-use in the process with an atmosphere of hydrogen at a temperature of at least 300°C and preferably at least 350°C.

It is believed that oxygen is adsorbed at sub-atmospheric pressures and temperatures as well as at higher temperatures and pressures and the treatment to remove adsorbed oxygen may be given after any exposure to air during preparation or transport of the solid or after the plant has been shut down and opened up. In particular, it may also be given after regeneration with an oxygen-containing gas.

Since the oxygen is strongly held on the catalyst or sorbent a severe treatment is, as stated above, necessary to remove it. Thus treatment with nitrogen even at temperatures of 400°C or more is not effective. A flowing stream of hydrogen may be required in practice. The duration and rate of flow can be determined by experiment. Suitable ranges have been found to be durations of 0.5 to 10 hours and, if a flow of hydrogen is used, flow rates of 50 to 200 v/v/hr. The upper limit of temperature will be fixed by the risk of thermal degradation of the catalyst or sorbent and will normally be 650°C, more particularly 550°C. The pressure for the hydrogen treatment is not critical and may be from 1 to 2000 psia.

The process is particularly suitable for use in a separation process using a zeolite sorbent, for example the separation of n-paraffins from hydrocarbon mixtures using a zeolite of 5A pore size. This type of separation has been extensively described in literature articles and patents. Specific types of process for which the present invention is suitable are to be found in U.K. Pat. Nos. 944,441 and 1,026,116. N-paraffins may be separated from mixtures of hydrocarbons having from four to 21 carbon atoms at adsorption temperatures of 50° to 450°C, particularly 300°-420°C. The adsorption pressure may be 15 to 500 psia and the space velocity 0.1 to 5 v/v/hr. The feedstock may be mixed with a gaseous diluent e.g., nitrogen or hydrogen in an amount of 50 to 200 v/v/hr. Various techniques are known for the desorption of the adsorbed n-paraffins, the most usual being displacement by a different hydrocarbon, particularly a different n-paraffin, or pressure reduction. In displacement processes the stages are usually isothermal and isobaric and the preferred displacing agent is a n-paraffin with fewer carbon atoms than the adsorbed n-paraffins e.g. a $C_4 - C_8$ n-paraffin. The space velocity of the displacing agent may be from 0.5 to 4 v/v/hr. In pressure reduction or, as they are better known, pressure-swing processes, the reduction in pressure required depends on the carbon number of the feedstock. The desorption pressure may be from 5 to 0.05 psia depending on the adsorption pressure and the feedstock used, being lower for higher carbon number feedstocks. Isothermal operation is usual.

A purge stage may be interposed between adsorption and desorption and this may use as purge agent a gas e.g. nitrogen or hydrogen at flow rates of 50 to 200 v/v/hr, a lower boiling n-paraffin e.g. a $C_4 - C_8$ n-paraffin at flow rates of 0.5 to 2 v/v/hr or a pressure reduction less than that of the desorption e.g. 15 - 2 psia.

The processes are operated cyclicly with, usually, relatively short adsorption, purge and desorption stages of 1 to 30 minutes. The ratios of adsorption, purge, and desorption times are usually simple multiples of such other e.g. 1:1:1, 1:1:2, or 1:1:3.

In all these processes there is, as stated earlier, a gradual decline in sorbent capacity with time and the zeolite is periodically regenerated by burning off the carbonaceous deposits using an oxygen-nitrogen mixture containing 0.2 – 2 percent oxygen and a maximum temperature of 600°C. Higher oxygen content gases e.g., those with 3 – 20 percent oxygen can be used in the final stages of the regeneration. The regenerated catalyst is purged with nitrogen and/or vacuum before being brought back on stream, but this has been found not sufficient to remove the adsorbed oxygen and the present invention is particularly useful after a regeneration step.

It is to be noted that the invention has been found useful with a 5A zeolite e.g. a calcium alumino-silicate which is theoretically neutral and not particularly acidic. It is also considered useful even when hydrogen is used as feed diluent or purge gas, since such contact with hydrogen during processing does not reduce capacity decline when compared with the use of nitrogen. It follows that the invention will also be useful with other catalysts or sorbents which are more acidic and/or which are used in the presence of hydrogen. For example it may be used with zeolite sorbents used for the separation of n-olefins or aromatics e.g. zeolites having pore openings of 6 – 15A, such as faujasite type zeolites, as well as 4 – 5A zeolites. It may also be used with zeolite catalysts, with or without a hydrogenating/dehydrogenating metal component, e.g. zeolites of the faujasite type, mordenite, offretite and erionite. Zeolite catalysts often have the zeolite in the hydrogen or decationised form and as such are relatively acidic.

Other potential uses are for treating alumina or silica sorbents or catalysts having alumina or silica as the catalyst support. Alumina or silica based catalysts and zeolite catalysts are used extensively for hydrocarbon conversion processes, e.g., hydrogenation, dehydrogenation and/or dehydrocyclisation (e.g., catalytic reforming), isomerisation, desulphurisation, cracking and hydrocracking under the following broad ranges of conditions.

|  | Temperature °C | Pressure psia |
| --- | --- | --- |
| Broad Range | 15 – 600 | 15 – 3000 |
| Hydrogenation | 15 – 300 | 50 – 3000 |
| Reforming | 400 – 600 | 50 – 500 |
| Cracking | 400 – 600 | 15 – 50 |
| Hydrocracking | 250 – 550 | 500 – 3000 |
| Isomerisation | 50 – 350 | 15 – 1000 |

The term sorbents includes materials used in chromatographic separation techniques.

A convenient method of determining the coke-forming tendency of catalysts and sorbents has been described by Pitkethly and Goble, as part of a study for measuring the surface areas of metals in supported metal catalysts, in Actes du Deuxieme Congres International de Catalyse, Paris 1960, at page 1,851. In this technique solids are contacted with vapours at low partial pressures and the amounts of vapour adsorbed and desorbed are measured. Adsorption at low relative pressures is normally attributable to chemisorption with a relatively small contribution from physical adsorption and the apparatus for measuring it has three principal sections, viz.
  a. a vapour introduction device
  b. a holder for the solid to be tested
  c. a vapour detector The vapour introduction device has a source of carrier gas, for example nitrogen or hydrogen, a container for the adsorbate and a valve allowing either the gas alone or gas containing very small quantities of the adsorbate to pass over the solid. The holder which contains the solid is capable of being held at a constant temperature over a wide temperature range. Gas passing over the solid then goes via a sampling valve to the vapour detector which may be a hydrogen flame-ionisation detector.

By passing a stream of gas containing the adsorbate over the solid to be tested and measuring the difference between the amount of material fed to the solid and the amount passing to the detectors, the amount of material adsorbed can be determined, after a small correction for dead space in the system. If the flow of material is then continued until the solid is in equilibrium with this material, the amount of material fed to the solid should be equal to the amount passing to the detectors. However, when the material to be adsorbed is benzene it is found that there is a difference between the amount of material fed to the acidic solid and the amount passing to the detectors and that the difference varies considerably depending on the treatment given to the solid. This difference is a measure of the coke-forming tendency since the "lost" benzene has been condensed to polynuclear aromatics the presence of which can in certain circumstances be subsequently detected by the fact that the solid fluoresces in ultra-violet light.

In an example, the solid tested by the benzene chemisorption test was a commercial silica gel catalyst containing a small amount of alumina as an impurity. The Al content of the silica was 0.04 percent wt. Before being placed in the apparatus it had been exposed to air at atmospheric temperature and pressure. Successive samples of the catalyst were heated in a stream of hydrogen flowing at 4,000 v/v/hr for 3 hours at various temperatures. The activated sample was then cooled to 170°C and the benzene adsorption studied by passing nitrogen containing 0.1 torr (mm Hg) of benzene over it for 1 hr. By measuring the discrepancy between the feed concentration of benzene and the concentration passing to the detectors once equilibrium was reached, a series of benzene losses were obtained for various temperatures of pretreatment in hydrogen over the range 170° – 450°C. After the treatment at 450°C and measurement of the benzene loss, a small quantity of air was admitted to the apparatus at 170°C and the benzene loss measured again. A similar series of experiments was also carried out using nitrogen instead of hydrogen for the pretreatment. The results are shown in graphical form in the attached drawing.

From the graph it will be seen that the catalyst had a high benzene loss after treatment in hydrogen at 170°C, but that this loss decreased as the treatment temperature was increased until the loss was negligible at 450°C. On exposing the catalyst treated in hydrogen at 450°C to air at 170°C, however, it immediately reverted to a high benzene loss. With treatment in nitrogen there was an initial decline in benzene loss up to 275°C, but above that temperature the benzene loss increased with increase in temperature. The sample of catalyst was removed from the apparatus after each activation and benzene loss measurement and examined. When the catalyst showed a significant benzene loss it was found to be discoloured and those activated above 300°C which showed a benzene loss fluoresced under an ultra violet lamp, indicating the presence of polynuclear aromatics formed from the lost benzene. Even though catalysts activated at below 300°C did not fluoresce, it was clear that high molecular weight materials were formed on their surface. There was no evidence of the formation of cracked low molecular weight products in the reactor effluent during the benzene adsorption and the large loss of benzene must, therefore, have been due to polymerisation.

The invention is illustrated by the following example.

EXAMPLE

A calcium alumino silicate Zeolite A of 5A pore size, which had been stored in air before use, was used to separate n-paraffins from a desulphurised gas oil having an ASTM boiling range of 243°C to 290°C. The gas oil consisted of $C_{14}$ to $C_{17}$ hydrocarbons of which 33.7 percent were n-paraffins, and 66.3 percent wt were non-linear hydrocarbons. The sulphur content was 1 ppm. The gas oil was passed over 200 ml (138.1 g) of the zeolite for 24 hours at

380°C 0 psig 0.25 v/v/hr

The refractive indices of successive fractions of the effluent were measured to determine when n-paraffins appeared in the effluent and hence the n-paraffin capacity of the zeolite.

After 24 hours the zeolite was desorbed by passing n-heptane at 380°C, 0 psig and 1.0 v/v/hr for 1 hour, and the n-heptane was in turn removed by passing nitrogen at 380°C, 0 psig and 120 v/v/hr for 1 hour. Gas oil was then readmitted and the cycle repeated for a period of at least 500 hours.

In a comparative experiment the zeolite was simply activated in nitrogen at 400°C for 4 hours. The initial capacity was 4.4 g of n-paraffin/100 g of zeolite and the capacity at 504 hours on stream, was 3.9 g/100 g of zeolite. The results were plotted graphically, and the line drawn showed an average decline in capacity of 0.6 g of n-paraffin/100 g of zeolite/1,000 hours.

In an example according to the present invention, the zeolite was treated after the nitrogen activation with hydrogen at 380°C, 15 psig and 120 v/v/hour for 2 hours. The initial capacity was 4.2 g/100 g and the capacity at 982 hours on stream was 4.0 g/100 g. The average decline in capacity shown by a graph of the results was 0.3 g/100 g/1,000 hours. Thus the hydrogen treatment halved the capacity decline.

We claim:

1. In a sorption process for the separation of hydrocarbon mixtures wherein some of the adsorbed compounds form coke by reacting with oxygen and in which the sorbent is a crystalline zeolite of substantially uniform pore size and free of hydrogenating metals and in which the zeolite sorbent as used in the sorption process has been exposed before such use to an oxygen-containing gas, the step of treating the zeolite sorbent with an atmosphere of hydrogen in the absence of the sorption feedstock at a temperature of at least 300°C after its exposure to the oxygen-containing gas to remove substantially all of the oxygen retained on the exposed zeolite sorbent.

2. A process as claimed in claim 1 wherein the hydrogen treatment is carried out at 350°–650°C.

3. A process as claimed in claim 1 wherein the hydrogen treatment is carried out in a flowing stream of hydrogen at 50 to 200 v/v/hr and at 1 to 2,000 psia for 0.5 to 10 hours.

4. A process as claimed in claim 1 wherein the hydrogen treatment is given after regeneration of the sorbent with an oxygen-containing gas.

5. A process as claimed in claim 1 wherein the sorbent is a 5A zeolite used for n-paraffin separation.

6. A process as claimed in claim 5 wherein the zeolite sorbent is used at an adsorption temperature of 50° – 450°C and a pressure of 15 – 500 psia to separate n-paraffins from a hydrocarbon mixture containing $C_4$–$C_{21}$ n-paraffins.

7. A process as claimed in claim 6 wherein the zeolite sorbent is desorbed in a isobaric and isothermal process with a lower n-paraffin having fewer carbon atoms than the adsorbed n-paraffins.

8. A process as claimed in claim 6 wherein the zeolite sorbent is desorbed in an isothermal process by pressure reduction to a pressure of from 5 to 0.05 psia.

* * * * *

PO-1050
(5/69)

UNITED STATES PATENT OFFICE
CERTIFICATE OF CORRECTION

Patent No. 3,849,299  Dated November 19, 1974

Inventor(s) Kenneth Hugh Bourne, et al

It is certified that error appears in the above-identified patent and that said Letters Patent are hereby corrected as shown below:

On the Title page, the following should appear as "[30] Foreign Application Priority Data": --
October 31, 1969    Great Britain...........53390/69 --.

Signed and Sealed this twenty-fourth Day of February 1976

[SEAL]

Attest:

RUTH C. MASON
*Attesting Officer*

C. MARSHALL DANN
*Commissioner of Patents and Trademarks*